Jan. 25, 1966  A. WOLESLAGLE  3,230,987
CHAIN SAW GUARD
Filed Dec. 9, 1963
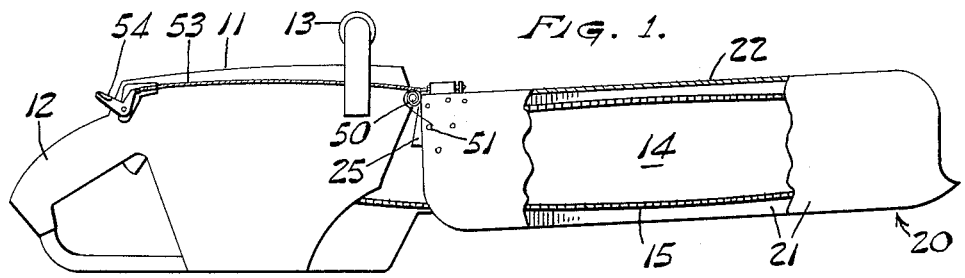
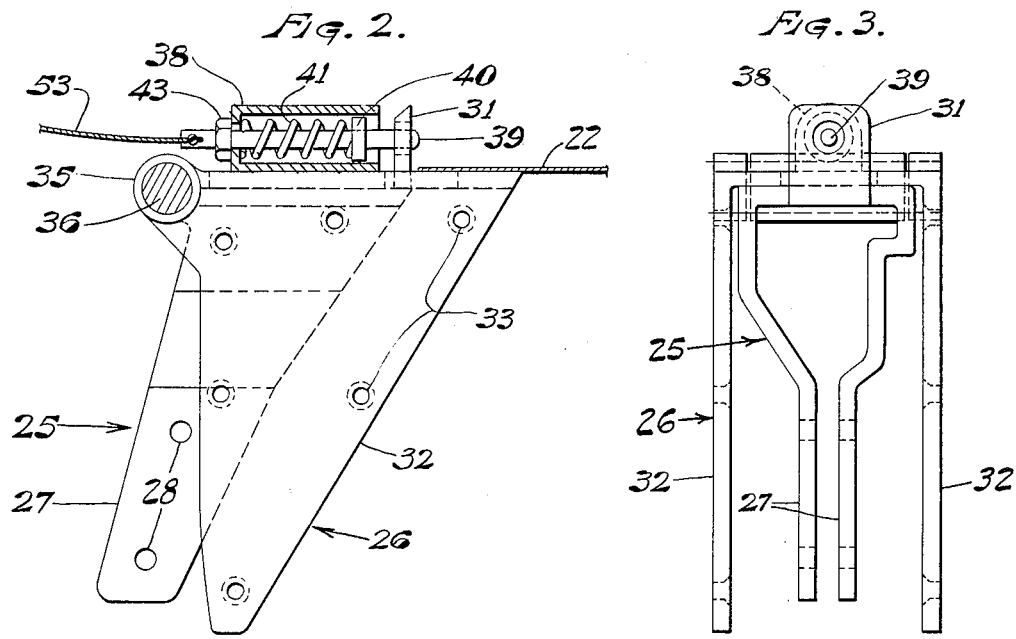
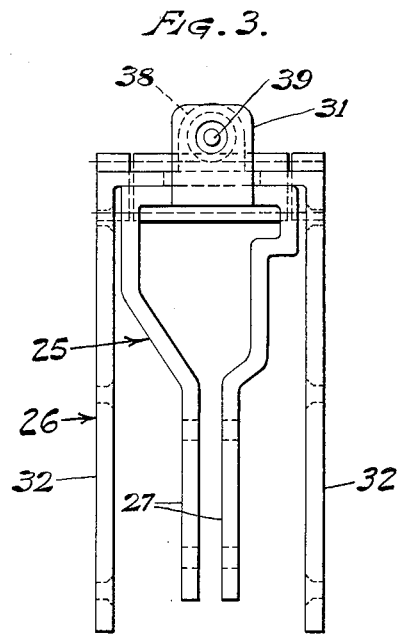
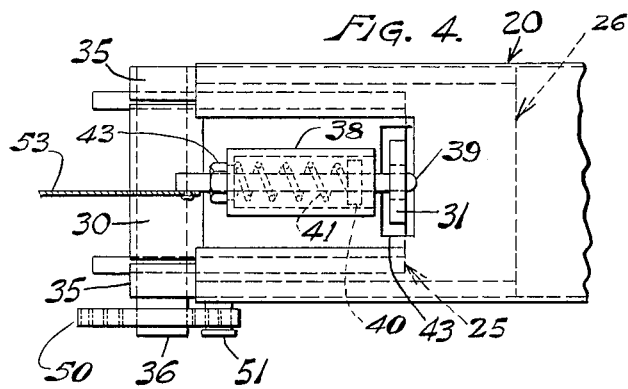
INVENTOR.
ARNOLD WOLESLAGLE
BY
Christel & Bean
ATTORNEYS.

United States Patent Office 3,230,987
Patented Jan. 25, 1966

3,230,987
CHAIN SAW GUARD
Arnold Woleslagle, Groveland, N.Y.
(Morris Road, Geneseo, N.Y.)
Filed Dec. 9, 1963, Ser. No. 328,826
5 Claims. (Cl. 143—32)

This invention relates to chain saws and particularly to a novel saw guard for use particularly with chain saws.

The problem of providing a satisfactory guard device for chain saws presents numerous difficulties and obstacles due to the special outboard nature of the saw member itself and the supporting bar therefor, the portable nature of chain saws, and the unavoidable flexibility of the projecting saw member due to its necessarily light construction and the stresses to which the saw member is subjected in various directions in ordinary use. A typical chain saw guard of the prior art is disclosed in my prior Patent No. 3,059,673, dated October 23, 1962.

The chain saw guard structure of the present invention obviates two difficulties which are particularly present in the case of prior art chain saw guards. First, the chain saw guard of the present invention may quickly and easily be applied to chain saws made by various manufacturers and various models despite the variations in such saws as to conformation of the housings thereof and as to dimensional relations between the housings and the saw members themselves. Second, the guard devices of the present invention are so mounted that they more or less automatically align with the saw members which extend outwardly from the supporting housings.

Basically speaking, these objectives are achieved by providing a saw guard which is entirely dissociated from the chain saw housing or drive portion and which, on the contrary, is fixed directly to the chain saw support plate commonly known in this art as the saw bar. Thus deflections of the unit comprising the saw bar and the chain saw with respect to the supporting and driving housing do not affect proper alignment between the saw and the guard and there is no necessity for special preliminary alignment between the saw guard and the chain saw and its supporting bar. Also, the design and conformation of the saw guard structure is entirely independent of the shape and general proportions and configurations of the chain saw support and drive structure.

Other objects and advantages of the chain saw guard construction of the present invention, by way of simplicity and economy of manufacture and inherent ruggedness, among others, will become apparent to those skilled in the present art from a consideration of the accompanying drawing and the following detailed specification which disclose a representative embodiment of the invention. However, it is to be understood that such embodiment is set forth by way of example only and that the principles of the invention are not limited thereto nor otherwise than as defined in the appended claims.

In the drawing:

FIG. 1 is a general elevational view of a chain saw equipped with one form of the saw guard of the present invention with portions of the guard broken away for added illustration;

FIG. 2 is a detailed elevational view on a larger scale showing the saw guard mounting structure of saw guard of FIG. 1;

FIG. 3 is an end elevational view of the mounting structure of FIG. 2; and

FIG. 4 is a top plan view of the mounting structure of FIG. 2.

In the drawing like characters denote like parts and the numeral 18 designates generally a power driven chain saw which is entirely conventional excepting for the novel guard structure of the present invention which is shown in association therewith in one form of the invention.

In FIG. 1 the numeral 11 designates the drive motor housing of a conventional chain saw and the numerals 12 and 13 designate the handles by which the saw is manipulated. A conventional saw supporting cutter bar is designated 14 and a chain saw element which extends about the cutter bar to be supported and guided thereby is designated 15. The connection between cutter bar 14 and the motor housing is conventional and the manner in which the chain saw element 15 is driven around the periphery of cutter bar 14 is likewise conventional and the details of construction of the chain saw in this respect need not be further illustrated or described.

In the drawing the guard member is generally designated 20 and comprises a pair of spaced side walls 21 and a connecting wall portion 22 which extends along the top and the front or outer end of the guard. As indicated in the preamble hereto, the guard 20 is pivotally mounted upon and carried entirely by the chain saw cutter bar 14. Pivotal mounting of the guard 20 is achieved by means of a pair of pivoted mounting brackets 25 and 26, the bracket 25 being fixed to cutter bar 14 and the bracket 26 to the guard 20.

Bracket 25 comprises an inverted U-shaped member and the lower portions of the leg member thereof, designated 27, are closely spaced so as to leave therebetween approximately the thickness of the metal plate which comprises the chain saw cutter bar 14. Attachment of bracket 25 to cutter bar 14 is by means of a pair of bolts which are secured through holes 28 in bracket 25.

Apart from the latch control cable for guard 20, the only assembly operation required in mounting the present saw guard on the chain saw is to drill a pair of holes in cutter bar 14 in registry with the holes 28 in leg members 27 of bracket 25 and apply bolts through these holes to securely fix bracket 25 to the cutter bar 14. The upper portion of bracket 25 includes a bearing formation 30 shown in FIG. 4 and an upstanding flange 31 which is perforated to receive a latch pin in a manner which will shortly be described.

Bracket 26 likewise comprises an inverted U-shaped member and its opposed legs are designated 32 and are spaced to fit closely within or between the opposed side walls 21 of the guard member 20. Bracket 26 is securely riveted to the walls of the guard member 20 through holes 33 in the bracket and corresponding holes in side walls 21 of guard member 20. The upper end of bracket 26 is provided with a pair of spaced bearing formations 35 which receive the bearing formation 30 of bracket 25 therebetween and a pivot shaft 36 is fixed in formation 30, as by welding or otherwise, and attaches the brackets 25 and 26 for relative pivotal movement.

As shown in FIG. 2, bracket 26 has a sleeve or tube formation 38 fixed to its upper surface and a latch pin 39 extends axially therethrough. Latch pin 39 includes an enlargement 40 and a spring 41 acts between enlargement 40 and the left-hand end of sleeve 38, as viewed in FIGS. 2 and 4, to urge the right-hand end of latch pin 39 toward flange 31 which acts as a keeper plate for the latch pin. Latch pin 39 is retained by a nut 43 which engages its left-hand end.

It will be noted that the upper end of flange 31 is beveled to facilitate automatic engagement of the right-hand end of latch pin 39 in the aperture in flange 31 when the latch pin 39 moves relatively downwardly with respect to flange 31 upon closing pivotal movement of guard member 20. The upper medial portion of bracket 26 is provided with a clearance hole 43' for permitting free passage of flange 31 of bracket 25 therethrough as the guard member 20 moves to closed position with respect to the chain saw.

A spiral torsion spring 50 is anchored at its center to pivot shaft 36 and bears against an abutment pin 51 on saw guard 20 to urge the saw guard in a clockwise direction toward closed or guarding position. A latch operating cable 53 is attached to the left-hand end of latch pin 39 as viewed in FIG. 2 and extends to one arm of a bell crank 54 which may be conveniently mounted adjacent to handle 12.

The other arm of bell crank 54 comprises a trigger and manual depression of the same withdraws latch pin 39 from flange 31 and releases the saw guard for upward pivotal movement to expose the chain saw for cutting operation. It will be noted that even though latch pin 39 is released, the guard 20 is urged pivotally toward a closed guarding position and will normally tend to move to fully latched position unless forces are present which hold the guard pivotally upwardly from such position, such forces being exerted against the lower edges of guard 20 by work against which the saw is engaged.

It will be noted that the forward or nose end of guard member 20 is curved upwardly so that the guard tends to be cammed open by work against which the saw is applied, as for instance the surface of a log or the like.

I claim:

1. In a chain saw, support means, drive means associated therewith, an oblong guide plate attached to and extending outwardly from said support means, a chain saw extending about said guide plate and having driven connection with said drive means, a guard for said chain saw comprising a relatively flat housing having spaced sides and open along a longitudinal edge thereof, and mounting means for said housing comprising a bracket having a portion rigidly secured to a face of said chain saw guide plate independently of said support means and means pivoting said guard housing to said bracket for edgewise swinging movement to and from saw enclosing position.

2. In a chain saw, support means, drive means associated therewith, an oblong guide plate attached to and extending outwardly from said support means, a chain saw extending about said guide plate and having driven connection with said drive means, a guard for said chain saw comprising a relatively flat housing having spaced sides and open along a longitudinal edge thereof, and mounting means for said housing comprising a U-shaped bracket adapted to straddle said chain saw and having leg portions secured to the opposite surfaces of said guide plate independently of said support means, and means pivoting said guard housing to said bracket for edgewise swinging movement to and from saw enclosing position.

3. In a chain saw, support means, drive means associated therewith, an oblong guide plate attached to and extending outwardly from said support means, a chain saw extending about said guide plate and having driven connection with said drive means, a guard for said chain saw comprising a relatively flat housing having spaced sides and open along a longitudinal edge thereof, and mounting means for said housing comprising a pair of U-shaped brackets pivoted to each other at their medial portions, the legs of one of said brackets being fixed to opposite sides of said guide plate independently of said support means and the legs of the other of said brackets being fixed to opposite side wall portions of said guard housing, whereby said guard is pivotally movable toward and away from saw-enclosing position.

4. In a chain saw, support means, drive means associated therewith, an oblong guide plate attached to and extending outwardly from said support means, a chain saw extending about said guide plate and having driven connection with said drive means, a guard for said chain saw comprising a relatively flat housing having spaced sides and open along a longitudinal edge thereof, mounting means for said housing comprising a bracket having a portion rigidly secured to a face of said chain saw guide plate independently of said support means and means pivoting said guard housing to said bracket for edgewise swinging movement to and from saw enclosing position, resilient means acting between said guard and said guide plate yieldably urging said guard housing to saw enclosing position, and manually releasable latch means operable to retain said guard in saw enclosing position.

5. In a power operated chain saw, drive means, an oblong guide plate attached to and extending outwardly from said drive means, a chain saw extending about said guide plate and having driven connection with said drive means, a guard for said chain saw comprising a housing having spaced sides and open along a longitudinal edge thereof for movement edgewise over said chain saw to enclose the same, and mounting means for said housing comprising a bracket having a portion rigidly secured to a face of said chain saw guide plate independently of said drive means and means pivoting said guard housing to said bracket for edgewise swinging movement to and from saw enclosing position.

References Cited by the Examiner
UNITED STATES PATENTS

| | | | |
|---|---|---|---|
| 2,779,359 | 1/1957 | Koski | 143—32 |
| 2,798,516 | 7/1957 | Heal et al. | 143—32 |
| 2,937,673 | 5/1960 | Duperron et al. | 143—32 |
| 3,059,673 | 10/1962 | Woleslagle | 143—32 |
| 3,154,120 | 10/1964 | Lesher | 143—32 |

DONALD R. SCHRAN, *Primary Examiner.*